Figure 1:
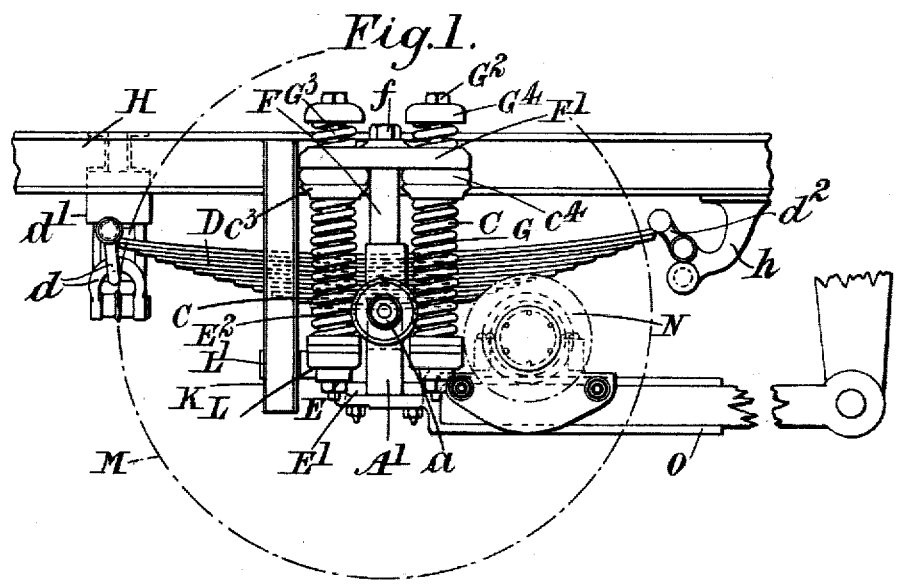

No. 814,198. PATENTED MAR. 6, 1906.
C. W. FULTON.
MOUNTING OR SUSPENSION FOR VEHICLE WHEELS.
APPLICATION FILED JUNE 16, 1905.

3 SHEETS—SHEET 1.

Witnesses:
Thomas Durant
Harry C. Bates.

Inventor:
Charles W. Fulton,
by Church & Church
his attys.

No. 814,198. PATENTED MAR. 6, 1906.
C. W. FULTON.
MOUNTING OR SUSPENSION FOR VEHICLE WHEELS.
APPLICATION FILED JUNE 16, 1905.
3 SHEETS—SHEET 2.
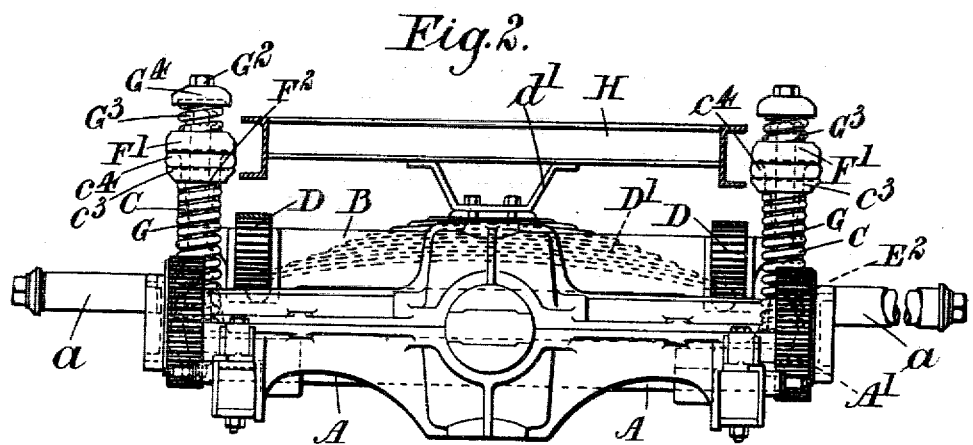
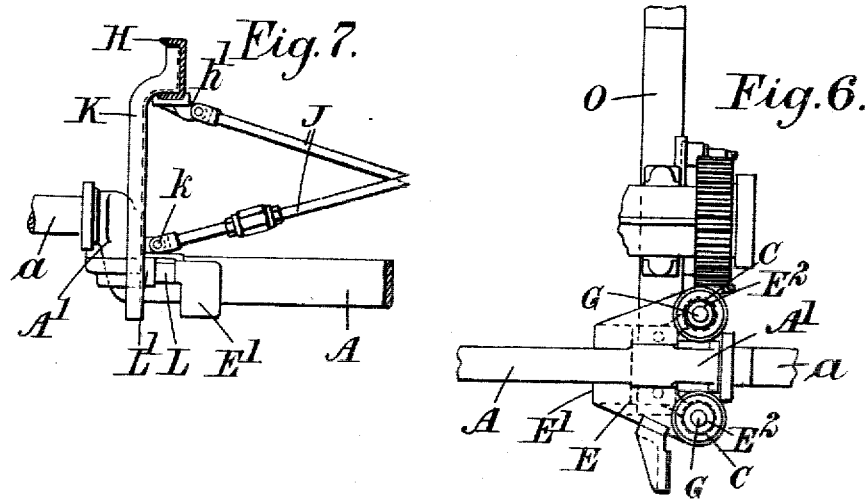
Witnesses:
Thomas Durant
Harry C. Bates.
Inventor,
Charles W. Fulton,
by Church & Church
his Attys.

No. 814,198. PATENTED MAR. 6, 1906.
C. W. FULTON.
MOUNTING OR SUSPENSION FOR VEHICLE WHEELS.
APPLICATION FILED JUNE 16, 1905.
3 SHEETS—SHEET 3.
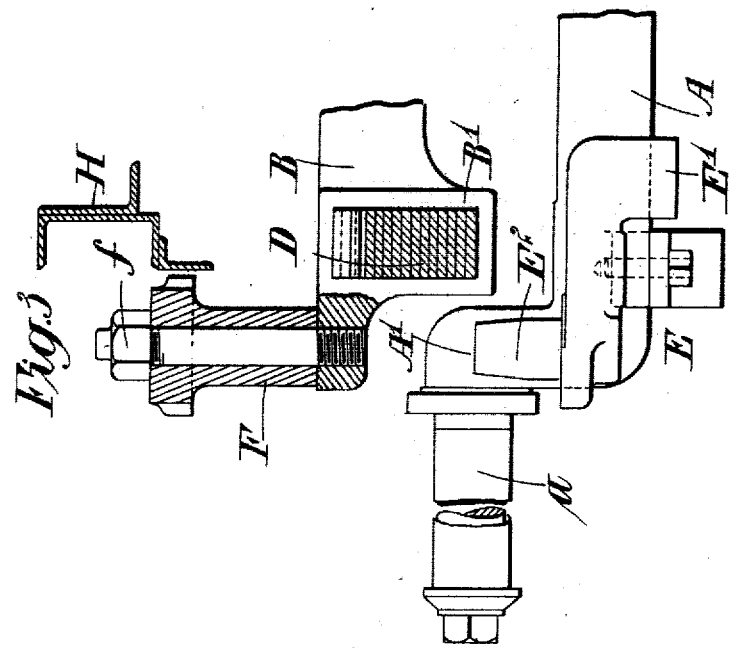
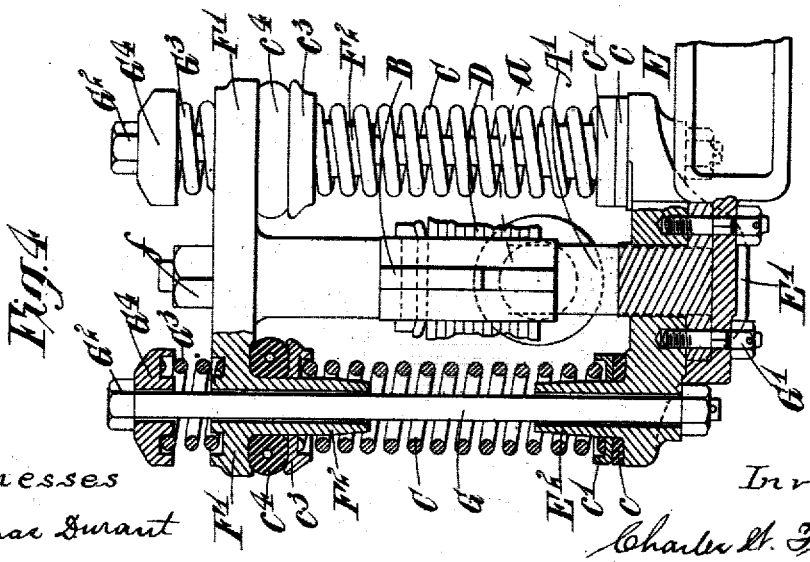
Witnesses
Thomas Durant
Harry C. Bates
Inventor:
Charles W. Fulton
by Church & Church
his attys.

UNITED STATES PATENT OFFICE.

CHARLES WM. FULTON, OF PAISLEY, SCOTLAND.

MOUNTING OR SUSPENSION FOR VEHICLE-WHEELS.

No. 814,198.            Specification of Letters Patent.            Patented March 6, 1906.

Application filed June 16, 1905. Serial No. 265,555.

*To all whom it may concern:*

Be it known that I, CHARLES WILLIAM FULTON, a subject of the King of Great Britain, residing at Paisley, Scotland, have invented a certain new and useful Mounting or Suspension for Vehicle-Wheels, of which the following is a specification.

This invention relates to the mounting or suspension of vehicle-wheels, and is more particularly applicable to motor-cars and similar vehicles.

According to this invention the road-wheels are mounted on a rigid axle extending across the vehicle and suspended by one or more springs from a second axle or its equivalent, between which and the body of the vehicle are interposed elliptic or other springs, and the two sets of springs are so constructed that they do not synchronize in their movements. This non-synchronizing effect is of such a nature that when one of the road-wheels passes over an obstruction the periods of vibration of the two springs or sets of springs cross each other to such an extent that the parts quickly but gradually come to rest without causing any inconvenient shock or jolting to the body of the vehicle.

The springs between the wheel-axle and the supporting axle are coil-springs and are preferably arranged in pairs, and the springs between the supporting-axle and the body of the vehicle are preferably elliptic or C springs and are arranged longitudinally of the vehicle eccentric to its longitudinal axis. The elliptic or C springs may be attached to the supporting-axle in any known manner, and the ends of this axle are preferably bent upward and carry at their ends a bar or plate having cups, sockets, or the like, against or within which rest one of the ends of the coil-springs. The wheel-supporting axle may be straight, but is preferably dipped or inclined at the part extending across the vehicle, and at a point directly below the spring-supporting bars or the like on the supporting-axle there is rigidly or pivotally attached a plate or support having cups or sockets for the reception of the other ends of the coil-springs. The end strain and also the side strain may be taken by guides or radius-rods connected to either or both axles. One radius-rod may serve to support both axles at each side of the vehicle by pivotally attaching the rod to one of the axles and providing it with a forked end or guide within which the other axle is free to move. When helical or coiled springs are employed between the two axles and elliptic or C springs between the supporting-axle and the vehicle, it has been found convenient to so construct the springs that for every five beats of the helical springs the elliptic spring performs one beat. Other forms of springs may, however, be used without departing from the invention, so long as the non-synchronizing effect above referred to is produced.

Figure 5:
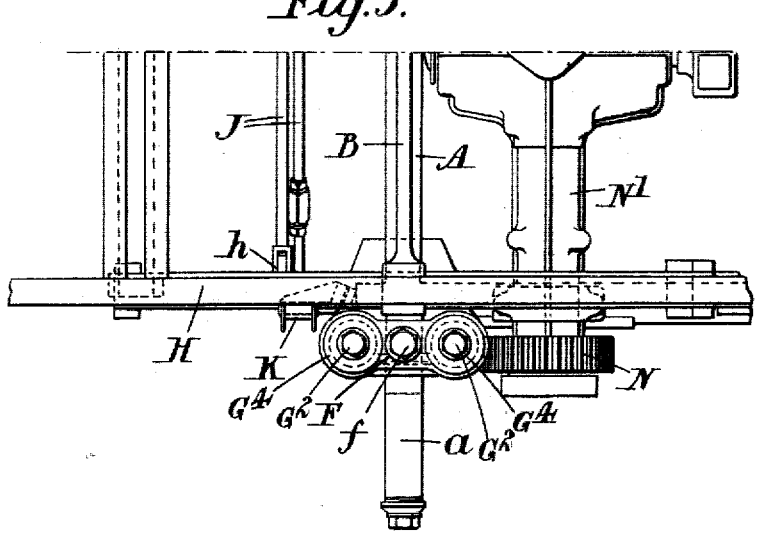

Referring to the drawings, Figure 1 is a front elevation, and Fig. 2 an end view, of the preferred form of wheel suspension constructed in accordance with this invention. Fig. 3 is a sectional elevation of the arrangement of suspension shown in Figs 1 and 2, the springs being removed. Fig. 4 is a rear elevation of the arrangement shown in Figs. 1 and 2. Fig. 5 is a plan of Fig. 1, showing the upper end of the suspension—that is to say, the part carried by the upper axle. Fig. 6 is a plan of the part of the suspension carried by the lower axle; and Fig. 7 is an elevation showing the end of the lower axle and a preferred arrangement of guides and tie-rods or stays.

Like letters indicate like parts throughout the drawings.

A is the lower or wheel-carrying axle. B is the upper axle. C represents the springs between the axles, and D represents the springs between the upper axle and the body of the vehicle.

The axle A extends across beneath the vehicle-body and has at each end a part $a$, which acts as a bearing for the road-wheels. The axle, which is preferably rectangular in cross-section, except at the parts $a$, upon which the wheels rotate, may be straight; but preferably it has at each end an upwardly-bent portion A', as clearly shown in Figs. 3 and 7, from the upper end of which the parts $a$ extend. Conveniently the axle A is so bent that the part $a$ is approximately in line with the axle B, so that wheels of the proper diameter can be accommodated without raising the vehicle appreciably higher than if the one cross-axle were employed.

On each end of the axle A, and preferably in line (when viewed from either end of the vehicle) with the upwardly-bent portion A', is attached a bracket or support E, upon which one or more springs, disposed between the axles A and B, rest. The support E comprises a base-piece E', which encircles the lower side of the axle A and has arms carrying sockets E². In the present example two coil-springs C are disposed between the axles, and their lower ends rest against the base E' of the brackets E, the sockets E² of which extend within the springs C. Although two coil-springs are shown, the springs may be of other appropriate form.

To the ends of the upper axle B, which is also preferably rectangular in cross-section, are attached brackets F, which are conveniently secured to the axle by bolts and nuts $f$. (See Fig. 3.) These brackets have arms F', against which the upper ends of the springs C bear, and sockets F², which extend within the coil-springs.

Passing through bosses E² and F² of the brackets E and F, respectively, are bolts or rods G, which act as guides for the springs and also prevent relative lateral movement of the brackets. At the lower ends the rods G have heads G', and at their upper ends adjustable nuts G², between which and the arms F' of the brackets F are disposed cushioning-springs G³. The lower ends of the springs G³ bear against the bracket F' and the upper ends against rings or washers G⁴, which in turn bear against the nuts G².

The ends of the springs C may bear directly against the respective brackets E and F; but preferably there are disposed between the lower ends of the springs and the brackets E a washer $c$ and a confining-ring $c'$, while the upper ends of the springs rest against rings $c^3$, between which and the brackets F are disposed rubber or other cushioning rings $c^4$.

The springs D between the upper axle B and the body H of the vehicle are preferably elliptic or C springs. In the arrangement shown the springs D pass through openings B' in the axle B and may be fixed in position in any convenient manner. The ends of the springs D are connected to the vehicle-frame. A preferred method of connecting the ends of the springs D to the vehicle is shown in Figs. 1 and 2. The rear ends of the springs D are connected by links $d$ to the ends of a spring D', which extends across the vehicle, as shown in Fig. 2, and is connected to a bracket $d'$ thereon at its center. The forward ends of the springs D are connected by links $d^2$ to a bracket $h$ on the vehicle-frame; but any other appropriate method of connecting the springs D to the vehicle may be employed. Tie-rods and guides are provided to take the side strain or to prevent endwise movement of the axles, and a convenient arrangement of this will now be described.

At one or both sides of the suspension are provided guides or horn-plates K, which are rigidly fixed to the vehicle-frame at their upper ends and against which bear arms L, secured to the brackets E. To reduce friction, the arms L are provided with rounded bearing-surfaces L', which come in contact with the rods K. These rods or bars K are strengthened by adjustable tie-rods J, which extend across beneath the vehicle and are pivotally connected at their lower ends to lugs $k$ on the bars K and at their upper ends are similarly connected to lugs $h'$ on the vehicle-frame. Thus any tendency of the axles A and B to move endwise is avoided and the parts of the suspension kept in position.

The end strain is conveniently taken by radius-rods, which may be attached to either or both axles at each side of the vehicle. In the example illustrated the road-wheels M are intended to be driven by spur-gearing—that is to say, an internally-toothed ring is attached to the road-wheels and adapted to gear with corresponding toothed wheels N, carried by a shaft N', which may be the differential shaft.

At or near each side of the vehicle radius-rods O are connected to the lower side of the brackets E and also support the shaft N', carrying the driving gear-wheels N, the other ends of the rods O being pivotally secured to the vehicle.

The road-wheels may be driven by other forms of mechanism, and the radius-rods may be otherwise connected than as above described.

What I claim as my invention, and desire to secure by Letters Patent, is—

1. In a mounting or suspension for vehicle-wheels, the combination with a wheel-supporting cross-axle, of a second cross-axle, resilient bodies between the two axles, and resilient bodies between the second axle and the vehicle.

2. In a mounting or suspension for vehicle-wheels, the combination with a wheel-supporting cross-axle, of a second cross-axle located between the wheel-carrying axle and the vehicle, resilient bodies between the two axles and resilient bodies between the second axle and the vehicle, for the purpose set forth.

3. In a mounting or suspension for vehicle-wheels, the combination with a wheel-supporting cross-axle, of a second cross-axle, springs between the two axles, and springs between the second axle and the vehicle.

4. In a mounting or suspension for vehicle-wheels, the combination with a wheel-supporting cross-axle, of a second axle located between the wheel-carrying axle and the vehicle, springs between the two axles, and springs between the second axle and the vehicle and so constructed that they do not synchronize in their movements with the springs between the two axles, for the purpose set forth.

5. In a mounting or suspension for vehicle-wheels, the combination with the road-wheels, of a cross-axle supporting the wheels, a second cross-axle, springs between the two axles, and springs connecting the second axle and the vehicle.

6. In a mounting or suspension for vehicle-wheels, the combination with the road-wheels, of a cross-axle supporting the wheels, a second cross-axle, springs between the two axles, and springs connecting the second axle and the vehicle and so constructed as to be non-synchronous in their movements with the springs between the two axles.

7. In a mounting or suspension for vehicle-wheels, the combination with the road-wheels, of a cross-axle supporting the wheels, a second cross-axle located between the wheel-carrying axle and the vehicle, springs between the two axles, brackets on the lower axle supporting the lower ends of the springs, brackets on the upper axle receiving the upper ends of the springs, and springs between the upper axle and the vehicle.

8. In a mounting or suspension for vehicle-wheels, the combination with the road-wheels, of a cross-axle supporting the wheels, a second cross-axle located between the wheel-carrying axle and the vehicle, springs between the two axles, brackets on the lower axle supporting the lower ends of the springs, brackets on the upper axle receiving the upper ends of the springs, and springs between the upper axle and the vehicle and so constructed as to be non-synchronous in their movements with the springs between the two axles.

9. In a mounting or suspension for vehicle-wheels, the combination with a cross-axle for supporting the road-wheels, and a second cross-axle located above the wheel-supporting axle, of coil-springs located between the two axles near their ends, brackets on the lower axle supporting the lower ends of the coil-springs, brackets on the upper axle receiving the upper ends of the springs, and elliptic springs connecting the upper axle with the vehicle.

10. In a mounting or suspension for vehicle-wheels, the combination with a cross-axle for supporting the road-wheels, and a second cross-axle located above the wheel-supporting axle, of coil-springs located between the two axles, brackets on the lower axle supporting the lower ends of the coil-springs, brackets on the upper axle receiving the upper ends of the springs, and elliptic springs connecting the upper axle with the vehicle and so constructed as to be non-synchronous in their movements with the springs between the two axles.

11. In a mounting or suspension for vehicle-wheels, the combination with a cross-axle for supporting the road-wheels, and a second cross-axle located above the wheel-carrying axle, of coil-springs disposed between the two axles, brackets on the lower axle for supporting the lower ends of the springs, brackets on the upper axle for receiving the upper ends of the springs, elliptic springs between the upper axle and the vehicle, links connecting one end of the elliptic springs to the vehicle, a cross-spring at the other end of the elliptic springs, links connecting the ends of the cross-spring to the elliptic springs, and means connecting the cross-spring to the vehicle.

12. In a mounting or suspension for vehicle-wheels, the combination with a cross-axle for supporting the road-wheels, and a second cross-axle located above the wheel-carrying axle, of coil-springs disposed between the two axles, brackets on the lower axle for supporting the lower ends of the springs, brackets on the upper axle for receiving the upper ends of the springs, elliptic springs between the upper axle and the vehicle, and so constructed as to be non-synchronous in their movements with the springs between the two axles, links connecting one end of the elliptic springs to the vehicle, a cross-spring at the other end of the elliptic springs, links connecting the ends of the cross-spring to the elliptic springs, and means connecting the cross-spring to the vehicle.

13. In a mounting or suspension for vehicle-wheels, the combination with a cross-axle for supporting the road-wheels, and a second cross-axle located above the wheel-carrying axle, of coil-springs between the two axles, brackets on the lower axle supporting the lower ends of the coil-springs, brackets on the upper axle receiving the upper ends of the coil-springs, guide-rods connecting the two brackets, and elliptic springs connecting the upper axle with the vehicle.

14. In a mounting or suspension for vehicle-wheels, the combination with a cross-axle for supporting the road-wheels, and a second cross-axle located above the wheel-carrying axle, of coil-springs between the two axles, brackets on the lower axle supporting the lower ends of the coil-springs, brackets on the upper axle receiving the upper ends of the coil-springs, guide-rods connecting the two brackets, and elliptic springs connecting the upper axle with the vehicle and so constructed as to be non-synchronous in their movements with the springs between the two axles.

15. In a mounting or suspension for vehicle-wheels, the combination with a cross-axle for supporting the road-wheels, and a second cross-axle located between the wheel-supporting axle and the vehicle, of coil-springs between the two axles, brackets on the lower axle supporting the lower ends of the coil-springs, brackets on the upper axle for receiving the upper ends of the springs, guide-rods passing through the brackets on the axles, elliptic springs arranged longitudinally of the vehicle and connecting the upper axle to the vehicle, and guides for taking the side strain of the suspension.

16. In a mounting or suspension for vehicle-wheels, the combination with a cross-axle for supporting the road-wheels, and a second cross-axle located between the wheel-supporting axle and the vehicle, of coil-springs between the two axles, brackets on the lower axle supporting the lower ends of the coil-springs, brackets on the upper axle for receiving the upper ends of the springs, guide-rods passing through the brackets on the upper and lower axles, elliptic springs arranged longitudinally of the vehicle and connecting the upper axle to the vehicle, said springs being so constructed as to be non-synchronous in their movements with the springs between the two axles, and guides for taking the side strain of the suspension.

17. In a mounting or suspension for vehicle-wheels, the combination with a cross-axle for supporting the road-wheels, and a second cross-axle located between the wheel-supporting-axle and the vehicle, of coil-springs between the two axles, brackets on the lower axle supporting the lower ends of the coil-springs, brackets on the upper axle for receiving the upper ends of the springs, guide-rods passing through the brackets on the axles, elliptic springs arranged longitudinally of the vehicle and connecting the upper axle to the vehicle, guides for taking the side strain of the suspension, and rods for taking the end strain of the suspension.

18. In a mounting or suspension for vehicle-wheels, the combination with a cross-axle for supporting the road-wheels, and a second cross-axle located between the wheel-supporting axle and the vehicle, of coil-springs between the two axles, brackets on the lower axle supporting the lower ends of the coil-springs, brackets on the upper axle for receiving the upper ends of the springs, guide-rods passing through the brackets on the upper and lower axles, elliptic springs arranged longitudinally of the vehicle and connecting the upper axle to the vehicle, said springs being so constructed as to be non-synchronous in their movements with the springs between the two axles, guides for taking the side strain of the suspension, and rods for taking the end strain of the suspension.

19. In a mounting or suspension for vehicle-wheels, the combination with a wheel-supporting cross-axle, and a second cross-axle, of springs disposed between the two axles, brackets on the lower axle for receiving the lower ends of the springs, brackets on the upper axle for receiving the upper ends of the springs, springs connecting the upper axle to the vehicle, and rods for taking the end strain of the suspension.

20. In a mounting or suspension for vehicle-wheels, the combination with a wheel-supporting cross-axle and a second cross-axle, of springs disposed between the two axles, brackets on the lower axle for receiving the lower ends of the springs, brackets on the upper axle for receiving the upper ends of the springs, springs connecting the upper axle to the vehicle and so constructed as to be non-synchronous in their movements with the springs between the two axles, and rods for taking the end strain of the suspension.

21. In a mounting or suspension for vehicle-wheels, the combination with a wheel-supporting cross-axle and a second cross-axle located above the wheel-supporting axle, of upwardly-bent portions on the wheel-supporting axle, bearings for the wheels at the upper ends of the bent portions, coil-springs between the two axles, brackets on the lower axle for supporting the lower ends of the springs, brackets on the upper axle for receiving the upper ends of the springs, and springs between the upper axle and the vehicle.

22. In a mounting or suspension for vehicle-wheels, the combination with a wheel-supporting cross-axle and a second cross-axle located above the wheel-supporting axle, of upwardly-bent portions on the wheel-supporting axle, bearings for the wheels at the upper ends of the bent portions, coil-springs between the two axles, brackets on the wheel-supporting cross-axle for supporting the lower ends of the springs, brackets on the upper axle for receiving the upper ends of the springs, and springs between the upper axle and the vehicle and so constructed as to be non-synchronous in their movements with the springs between the two axles.

23. In a mounting or suspension for vehicle-wheels, the combination with a wheel-supporting cross-axle, of a second cross-axle located above the wheel-supporting axle, upwardly-bent portions on the wheel-supporting axle, bearings for the wheels at the upper ends of the upwardly-bent portions, coil-springs between the two axles, brackets on the lower axle, arms on the brackets, sockets carried by the arms to receive the lower ends of the coil-springs, brackets on the upper axle, arms on the brackets, sockets on the arms to receive the upper ends of the coil-springs, and elliptic springs connecting the upper axle with the vehicle.

24. In a mounting or suspension for vehicle-wheels, the combination with a wheel-supporting cross-axle, of a second cross-axle located above the wheel-supporting axle, upwardly-bent portions on the wheel-supporting axle, bearings for the wheels at the upper ends of the upwardly-bent portions, coil-springs between the two axles, brackets on the lower axle, arms on the brackets, sockets carried by the arms to receive the lower ends of the coil-springs, brackets on the upper axle, arms on the brackets, sockets on the arms to receive the upper ends of the coil-springs, and elliptic springs connecting the upper axle with the vehicle and so constructed as to be non-synchronous in their movements with the springs between the two axles.

25. In a mounting or suspension for vehicle-wheels, the combination with a wheel-supporting cross-axle, a second cross-axle located above the wheel-supporting axle, springs between the two axles, brackets on the lower axle, sockets on the brackets to receive the lower ends of the coil-springs, brackets on the upper axle, sockets on the brackets to receive the upper ends of the coil-springs, guide-rods passing through the brackets on the upper and lower axles, upwardly-bent portions on the ends of the lower axle, and bearings for the road-wheels at the upper ends of the upwardly-bent portions, of cushioning-springs located between the brackets on the upper axle and heads on the guide-rods passing through the brackets.

26. In a mounting or suspension for vehicle-wheels, the combination with a wheel-supporting cross-axle, a second cross-axle located above the wheel-supporting axle, springs between the two axles, brackets on the lower axle, sockets on the brackets to receive the lower ends of the coil-springs, springs connecting the upper axle to the vehicle and so constructed as to be non-synchronous in their movements with the springs between the two axles, brackets on the upper axle, sockets on the brackets to receive the upper ends of the coil-springs, guide-rods passing through the brackets on the upper and lower axles, upwardly-bent portions on the ends of the lower axle, and bearings for the road-wheels at the upper ends of the upwardly-bent portions, of cushioning-springs located between the brackets on the upper axle and heads on the guide-rods passing through the brackets.

27. In a mounting or suspension for vehicle-wheels, the combination with a wheel-supporting cross-axle, a second cross-axle located between the wheel-supporting axle and the vehicle, a pair of coil-springs between the ends of the two axles, and springs connecting the upper axle to the vehicle, of horn-plates connected to the vehicle and adapted to take the side strain of the suspension, and arms connected to the suspension and bearing against the horn-plates.

28. In a mounting or suspension for vehicle-wheels, the combination with a wheel-supporting cross-axle, a second cross-axle located between the wheel-supporting axle and the vehicle, a pair of coil-springs between the ends of the two axles, and springs connecting the upper axle to the vehicle and so constructed as to be non-synchronous in their movements with the springs between the two axles, of horn-plates connected to the vehicle and adapted to take the side strain of the suspension, and arms connected to the suspension and bearing against the horn-plates.

29. In a mounting or suspension for vehicle-wheels, the combination with a wheel-supporting cross-axle, a second cross-axle located between the wheel-supporting axle and the vehicle, a pair of coil-springs between the ends of the two axles, and springs connecting the upper axle to the vehicle, of horn-plates connected to the vehicle and adapted to take the side strain of the suspension, arms connected to the suspension and bearing against the horn-plates, and tie-rods attached to the horn-plates and to the vehicle.

30. In a mounting or suspension for vehicle-wheels, the combination with a wheel-supporting cross-axle, a second cross-axle located between the wheel-supporting axle and the vehicle, a pair of coil-springs between the ends of the two axles, and springs connecting the upper axle to the vehicle and so constructed as to be non-synchronous in their movements with the springs between the two axles, of horn-plates connected to the vehicle and adapted to take the side strain of the suspension, arms connected to the suspension and bearing against the horn-plates, and tie-rods attached to the horn-plates and to the vehicle.

31. In a mounting or suspension for vehicle-wheels, the combination with a wheel-supporting cross-axle, a second cross-axle located between the wheel-supporting axle and the vehicle, a pair of coil-springs between the ends of the two axles, and springs connecting the upper axle to the vehicle, of radius rods for taking the end strain on the suspension.

32. In a mounting or suspension for vehicle-wheels, the combination with a wheel-supporting cross-axle, a second cross-axle located between the wheel-supporting axle and the vehicle, a pair of coil-springs between the ends of the two axles, and springs connecting the upper axle to the vehicle and so constructed as to be non-synchronous in their movements with the springs between the two axles, of radius-rods for taking the end strain on the suspension.

33. In a mounting or suspension for vehicle-wheels, the combination with the road-wheels, of a wheel-supporting cross-axle, upwardly-bent portions at each end of the cross-axle, bearings for the wheels at the upper ends of the upwardly-bent portions, a second cross-axle located between the wheel-supporting axle and the vehicle, brackets at each end of the lower axle, brackets on each end of the upper axle, a pair of springs disposed between the two axles one on each side of the upper axle, guide-rods passing through the brackets on the upper and lower axles, resilient cushions between the upper ends of the springs and the brackets on the upper axle, shoulders on the guide-rods, cushioning-springs disposed between the heads on the guide-rods and the brackets on the upper axle, elliptic springs located at each side of the vehicle, means connecting the elliptic springs to the upper axle, links connecting one end of the elliptic springs to the vehicle, a cross-spring, means for connecting the other ends of the elliptic springs to the cross-spring, means connecting the center of the cross-spring to the vehicle, means for taking the side strain on the suspension, radius-rods connected to the suspension and to the vehicle and adapted to take the end strain, a counter-shaft, gear-wheels on the counter-shaft for rotating the road-wheels, and bearings on the radius-rods for supporting the counter-shaft substantially as set forth.

34. In a mounting or suspension for vehicle-wheels, the combination with the road-wheels, of a wheel-supporting cross-axle, upwardly-bent portions at each end of the cross-axle, bearings for the wheels at the upper ends of the upwardly-bent portions, a second cross-axle located between the wheel-supporting axle and the vehicle, brackets at each end of the lower axle, brackets on each end of the upper axle, a pair of springs disposed between the two axles, one on each side of the upper axle, guide-rods passing through the brackets on the axles, resilient cushions between the upper ends of the springs and the brackets on the upper axle, shoulders on the guide-rods, cushioning-springs disposed between the shoulders on the guide-rods and the brackets on the upper axle, elliptic springs located at each side of the vehicle and so constructed as to be non-synchronous in their movements with the springs between the two axles, means connecting the elliptic springs to the upper axle, links connecting one end of the elliptic springs to the vehicle, a cross-spring and means for connecting the other ends of the elliptic springs to the cross-spring, means connecting the center of the cross-spring to the vehicle, means for taking the side strain on the suspension, radius-rods connected to the suspension and to the vehicle and adapted to take the end strain, a counter-shaft, gear-wheels on the counter-shaft for rotating the road-wheels, and bearings on the radius-rods for supporting the counter-shaft, substantially as set forth.

In testimony whereof I have signed my name to this specification in the presence of two subscribing witnesses.

CHAS. WM. FULTON.

Witnesses:
   CLAUDE GILLIES,
   ROBERT THOMSON.